US012583736B2

(12) United States Patent
DeMers

(10) Patent No.: US 12,583,736 B2
(45) Date of Patent: Mar. 24, 2026

(54) PROTECTIVE ENCLOSURE FOR DIESEL EXHAUST FLUID PUMP

(71) Applicant: Petroman Parts Inc., Papillion, NE (US)

(72) Inventor: Douglas James DeMers, Papillion, NE (US)

(73) Assignee: Petroman Parts Inc., Papillion, NE (US)

( * ) Notice: Subject to any disclaimer, the term of this patent is extended or adjusted under 35 U.S.C. 154(b) by 113 days.

(21) Appl. No.: 18/630,300

(22) Filed: Apr. 9, 2024

(65) Prior Publication Data

US 2025/0313451 A1 Oct. 9, 2025

(51) Int. Cl.
*B67D 7/84* (2010.01)
*B67D 7/02* (2010.01)

(52) U.S. Cl.
CPC ................. *B67D 7/84* (2013.01); *B67D 7/02* (2013.01)

(58) Field of Classification Search
CPC ... B67D 7/00; B67D 7/02; B67D 7/04; B67D 7/84; B67D 2200/00031; H02G 3/10; A47B 47/02; A47F 3/002; H05K 5/0209
USPC ....... 312/100, 101, 102, 215, 220, 246, 351, 312/352, 400, 409; 222/609; 49/504
See application file for complete search history.

(56) References Cited

U.S. PATENT DOCUMENTS

| | | | | | |
|---|---|---|---|---|---|
| 2,816,330 | A * | 12/1957 | Sherron | E04H 1/14 D25/16 |
| 3,216,606 | A * | 11/1965 | Garner | A47K 10/3827 312/328 |
| 3,800,108 | A * | 3/1974 | Inagawa | D06F 37/42 200/61.62 |
| 4,095,445 | A * | 6/1978 | Storlie | E05B 13/106 70/215 |
| 5,970,663 | A * | 10/1999 | McDonough | A47B 96/067 52/79.5 |
| 8,496,138 | B2 * | 7/2013 | Gehman | B67D 7/02 222/530 |
| 10,336,601 | B2 * | 7/2019 | Wiebe | B67D 7/42 |
| 2016/0123655 | A1 * | 5/2016 | Chow | F25D 23/067 312/405 |

* cited by examiner

*Primary Examiner* — Daniel J Troy
*Assistant Examiner* — Elizabeth Irene Artalejo
(74) *Attorney, Agent, or Firm* — Hovey Williams LLP

(57) ABSTRACT

A protective enclosure for a diesel exhaust fluid pump having a filling hose and nozzle includes a metal cabinet that covers the filling hose and nozzle and that has an opening that permits retrieval and use of the hose and nozzle. The cabinet has sidewalls that are wider at their bottoms and a bottom wall that slopes from front to back.

8 Claims, 7 Drawing Sheets

PROTECTIVE ENCLOSURE FOR DIESEL EXHAUST FLUID PUMP

BACKGROUND OF THE INVENTION

Diesel Exhaust Fluid (DEF) is a non-toxic, colorless, and odorless fluid that is used in modern diesel engines equipped with Selective Catalytic Reduction (SCR) systems. It is composed of approximately 32.5% high-purity urea and 67.5% deionized water.

DEF plays a crucial role in reducing emissions from diesel engines. When diesel fuel is burned in an engine, it produces harmful nitrogen oxides (NOx) as a byproduct. The SCR system, which includes a catalyst and a diesel particulate filter (DPF), helps to convert these nitrogen oxides into harmless nitrogen gas and water vapor.

DEF is injected into the exhaust stream, typically before the SCR catalyst. Inside the catalyst, DEF undergoes a chemical reaction called hydrolysis, where it breaks down into ammonia (NH3) and carbon dioxide (CO2). The ammonia then reacts with the nitrogen oxides in the exhaust gases, converting them into nitrogen gas and water vapor.

The use of DEF in diesel engines helps to significantly reduce nitrogen oxide emissions, which are a major contributor to air pollution and smog. It allows diesel engines to meet stringent emission standards set by regulatory bodies such as the Environmental Protection Agency (EPA) and the European Union.

Vehicles equipped with SCR systems have a separate DEF tank, usually located near the diesel fuel tank. The DEF tank is designed to be easily accessible, allowing drivers or operators to refill it as needed.

Many truck stops have DEF pumps adjacent to fuel pumps so drivers can fill both tanks without moving their trucks. Because DEF can freeze at temperatures below 12 degrees Fahrenheit, many DEF pumps have "flapper" doors for covering their hoses and nozzles to limit heat loss. These flapper doors are typically made of rubber and are attached so as to be lifted upwardly about an upper horizontal-extending hinge or pivot. Unfortunately, these flapper doors often become deformed and/or cracked after repeated use and therefore don't sufficiently seal out cold air. They also often fall on the hands and heads of users as they attempt to access and replace the DEF hoses and nozzles.

SUMMARY OF THE INVENTION

The present invention solves the above-described problems and provides a distinct advance in the art of DEF pumps. More particularly, the present invention provides a more effective way to prevent the DEF in DEF pump hoses and nozzles from freezing.

An embodiment of the invention is a protective enclosure for a diesel exhaust fluid pump having a fluid filling hose and a nozzle. The protective enclosure comprises a metal cabinet that covers and protects the filling hose and nozzle. The cabinet has a front opening that permits retrieval and use of the hose and nozzle and is preferably attached to the pump with removable bolts so that it can be easily removed during seasons of non-freezing weather. As disclosed in more detail below, the cabinet is sized and configured to more effectively prevent the DEF in DEF pump hoses and nozzles from freezing.

The protective enclosure further comprises a metal door attached to the cabinet. The door is shiftable between a closed position in which it covers the opening in the cabinet and an opened position in which it uncovers the opening to provide access to the hose and nozzle. The door may be hingedly connected to the left side of the cabinet so that it swings leftward between its closed and opened positions. Alternately, the door may be hingedly connected to the right side of the cabinet so that it swings rightward between its closed and opened positions. In some embodiments, the protective enclosure may be equipped with left and right sets of hinges so an installer can select the best mounting method for the DEF pump. As disclosed in more detail below, the door is also configured to more effectively prevent the DEF in DEF pump hoses and nozzles from freezing.

Embodiments of the protective enclosure further comprises a door handle shiftable between a closed position in which it prevents the door from being opened and an opened position in which it allows the door to be opened. The handle may be equipped with a locking mechanism with a removable key or a keypad for selectively locking and unlocking the handle in its closed position so that a non-functioning or out of service DEF pump can be locked out.

Embodiments of the protective enclosure may further comprise a heater for heating the inside of the cabinet to prevent diesel exhaust fluid in the filling hose and nozzle from freezing. Insulation may be adhered to the interior surfaces of both the door and the cabinet to reduce heat loss from the protective enclosure. The protective enclosure may also comprise a door switch that enables the heater only when the door is in the closed position and a thermostat that enables the heater only when an ambient temperature is below a threshold temperature.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF DRAWING FIGURES

Embodiments of the present invention are described in detail below with reference to the attached drawing figures, wherein.

Figure 1:
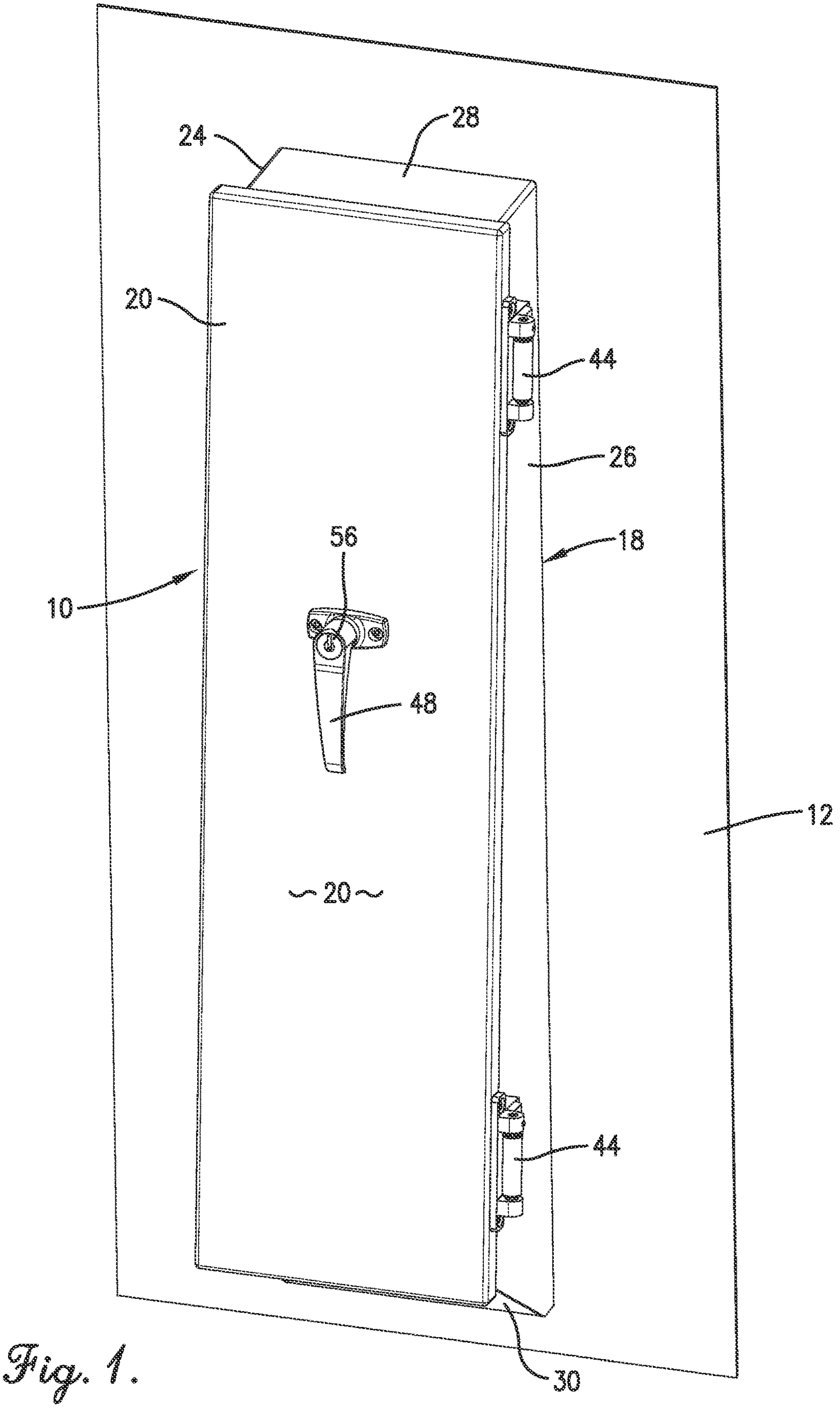
FIG. 1 is a front perspective view of a protective enclosure constructed in accordance with an embodiment of the invention shown attached to a diesel exhaust fluid (DEF) pump.

The drawing figures do not limit the present invention to the specific embodiments disclosed and described herein.

The drawings are not necessarily to scale, emphasis instead being placed upon clearly illustrating the principles of the invention.

DETAILED DESCRIPTION

Figure 2:
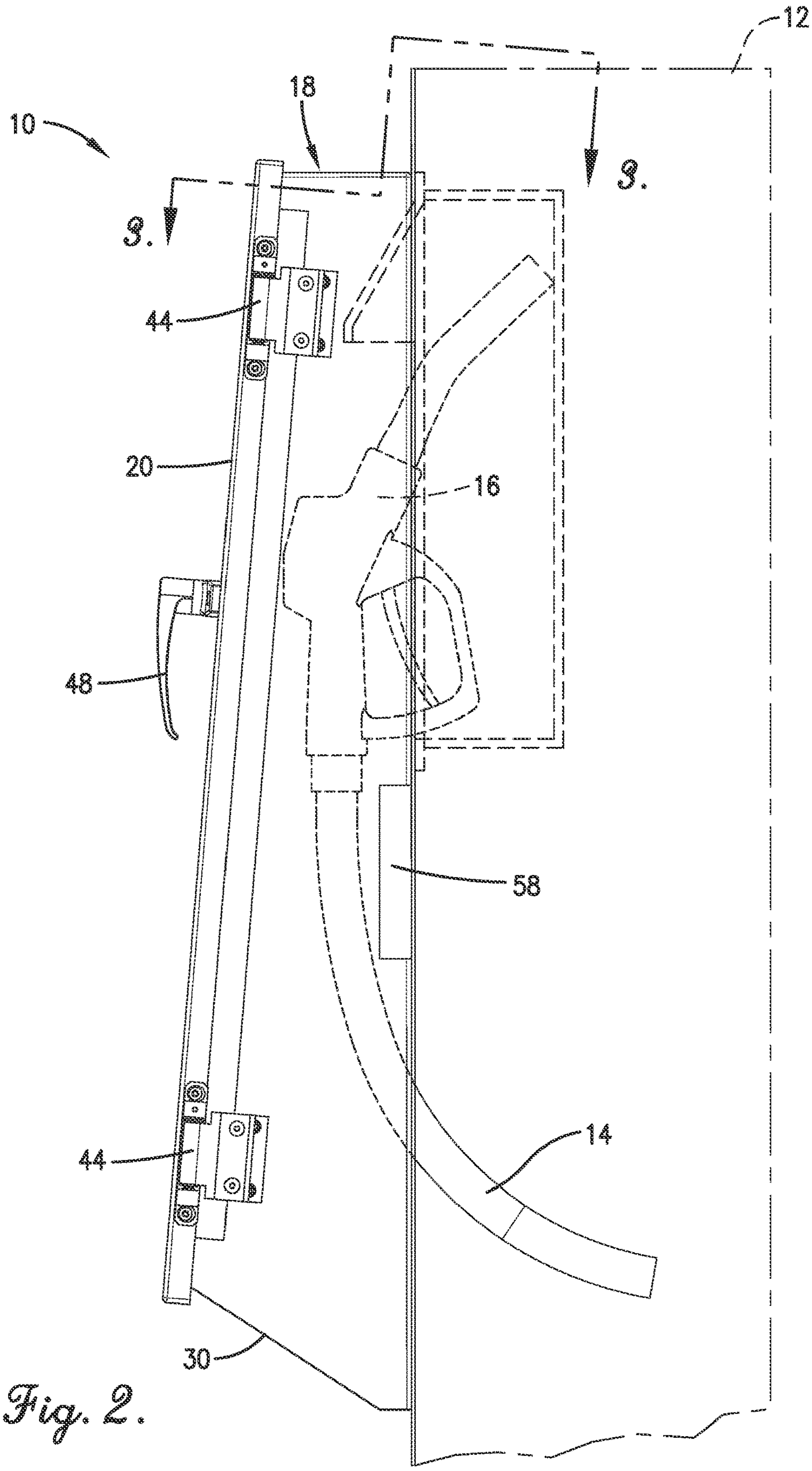
FIG. 2 is a side sectional view of the protective enclosure and portions of the DEF pump with the DEF pump shown in dashed lines.
Figure 4:
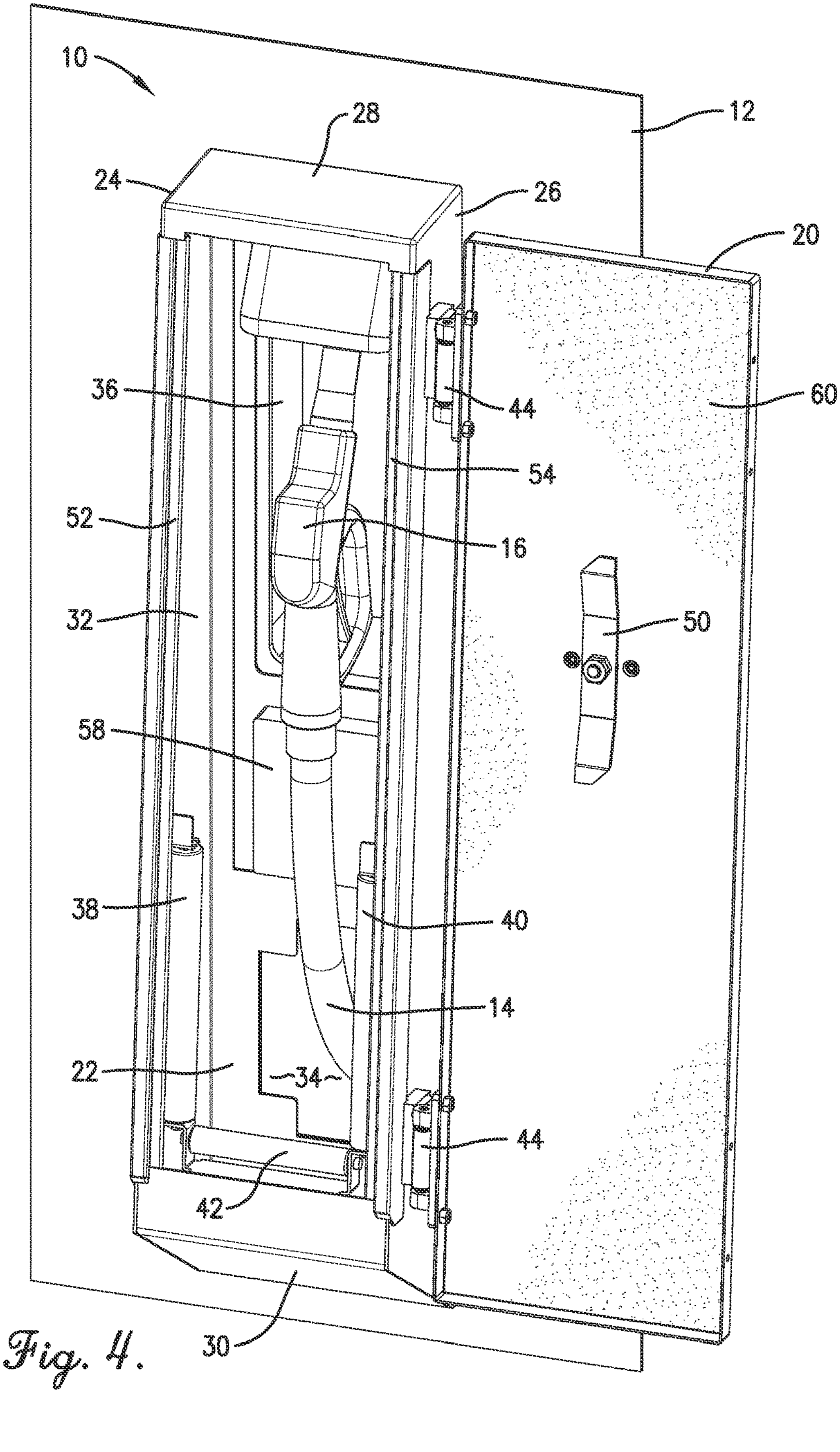
FIG. 4 is a front perspective view of the protective enclosure with its door opened.

Turning now to the drawing figures, a protective enclosure 10 constructed in accordance with embodiments of the invention is illustrated. As best shown in FIGS. 1, 2, and 4, the protective enclosure 10 is configured to be mounted to a diesel exhaust fluid (DEF) pump 12 having a fluid hose 14 and a nozzle 16. The protective enclosure 10 prevents freezing of DEF in the hose and nozzle and otherwise protects the hose and nozzle when used to fill a vehicle DEF tank and when not in use.

An embodiment of the protective enclosure 10 broadly comprises a metal cabinet 18 that covers the hose 14 and nozzle 16 and a metal door 20 mounted to the cabinet for providing access to the filling hose 14 and nozzle 16 when the door is open and protecting the hose and nozzle when the door is closed.

Figure 5:
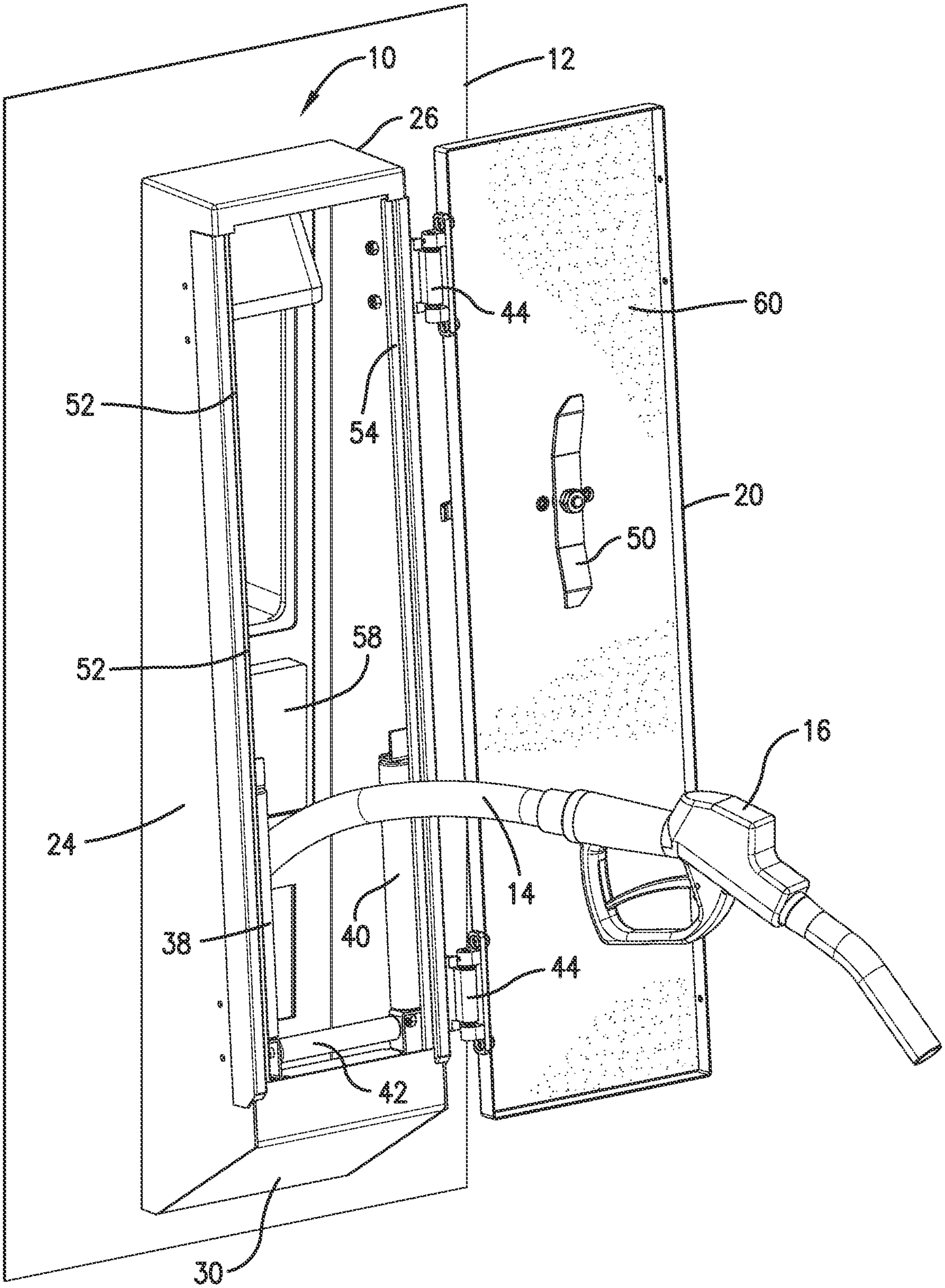
FIG. 5 is a front perspective view of the protective enclosure with its door opened and the DEF pump nozzle shown removed from the enclosure.

The cabinet 18 may be made of stainless steel, composite materials, and/or other rigid and weatherproof materials. As best shown in FIG. 4, an embodiment of the cabinet 18 has a back wall 22 that mounts to the DEF pump; left, right, top, and bottom walls 24, 26, 28, 30 that extend from the back wall; and a front opening 32 that permits retrieval and use of the hose and nozzle. An embodiment, the back wall 22 has a cutout 34 for accommodating the fluid hose 14 and another cutout 36 for accommodating the nozzle 16. As best shown in FIGS. 4 and 5, the left and right walls 24, 26 are wider at the bottom so that the top of the cabinet 18 and door 20 are tilted inwardly toward the DEF pump. The bottom wall 30 is angled so that it slopes downwardly from the front to back toward the DEF pump.

The cabinet is preferably attached to the diesel exhaust fluid pump with removable bolts so that the protective enclosure may be easily removed during seasons of non-freezing weather.

As best shown in FIG. 4, embodiments of the cabinet may also include a pair of vertically extending rollers 38, 40 and a horizontally extending roller 42 positioned around the lower cutout 34 in the cabinet back wall 22. The rollers 38, 40, 42 engage and protect the hose 14 when it and the nozzle 16 are pulled out of the cabinet during vehicle fueling.

The metal door 20 is attached over the cabinet opening and is shiftable between a closed position shown in FIG. 1 in which it covers the opening 32 and an opened position shown in FIG. 4 in which it uncovers the opening 32 to provide access to the hose 14 and nozzle 16. The door 20 is also fabricated of stainless steel, composite materials, and/or other rigid and weatherproof materials.

Figure 6:
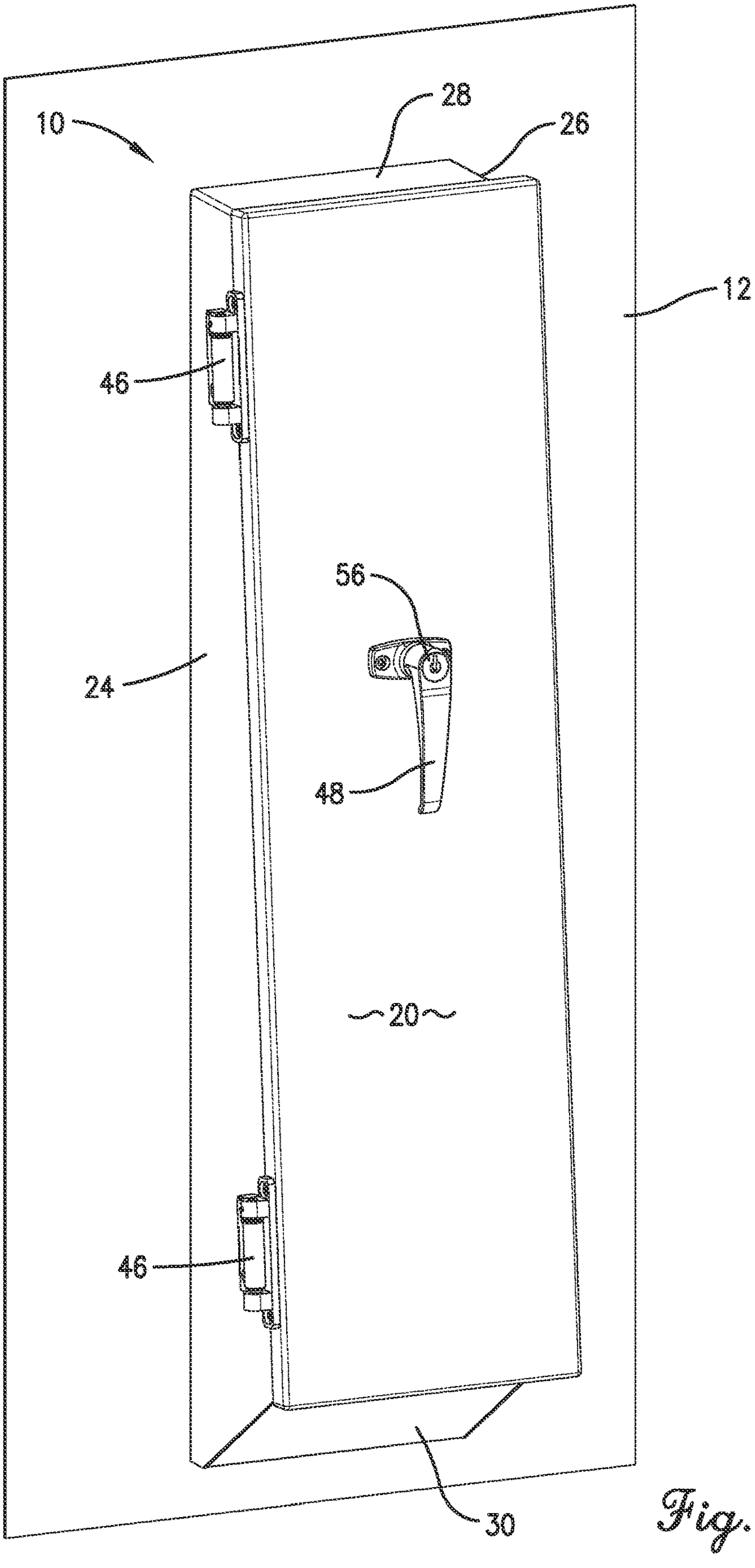
FIG. 6 is a front perspective view of a protective enclosure constructed in accordance with another embodiment of the invention in which the door is hinged on its left side.

As shown in FIG. 1, the door 20 may be attached to the cabinet with door hinges 44 attached to a right side of the door and mounted on a right side of the cabinet so the door is hingedly connected to the right side of the cabinet and swings rightward between its closed and opened positions. Alternately, as shown in FIG. 6, the door may be attached to the cabinet with door hinges 46 attached to a left side of the door and mounted on a left side of the cabinet so the door is hingedly connected to the left side of the cabinet and swings leftward between its closed and opened positions. In some embodiments, the protective enclosure may be equipped with both sets of hinges so an installer can select the best mounting position of the door to minimize interference with nearby objects. Unlike conventional flapper doors on DEF pumps, the door is mounted so that it cannot fall or close on the hands or heads of users as they handle the hose and nozzle of the DEF pump.

Embodiments of the protective enclosure further comprise a door handle 48 and attached locking bar 50 that engages a pair of locking tabs 52, 54 that are on the front sides of the cabinet. The door handle 48 and locking bar are shiftable between a closed position shown in FIG. 3 in which the locking bar slides behind and engages the locking tabs 52, 54 to prevent the door from being opened and an opened position shown in FIG. 4 in which the locking bar 50 is rotated away from the locking tabs 52, 54 to allow the door to be opened.

The handle 48 may be equipped with a locking mechanism 56 and a removeable key or keypad for selectively locking and unlocking the handle in its closed position so that a non-functioning or out of service DEF pump can be locked out. The handle 48, locking bar 50, and locking tabs 52, 54 also keep the door 20 firmly seated against the cabinet 18 to prevent cold air from flowing into the cabinet and freezing the DEF in the hose and nozzle.

Figure 3:
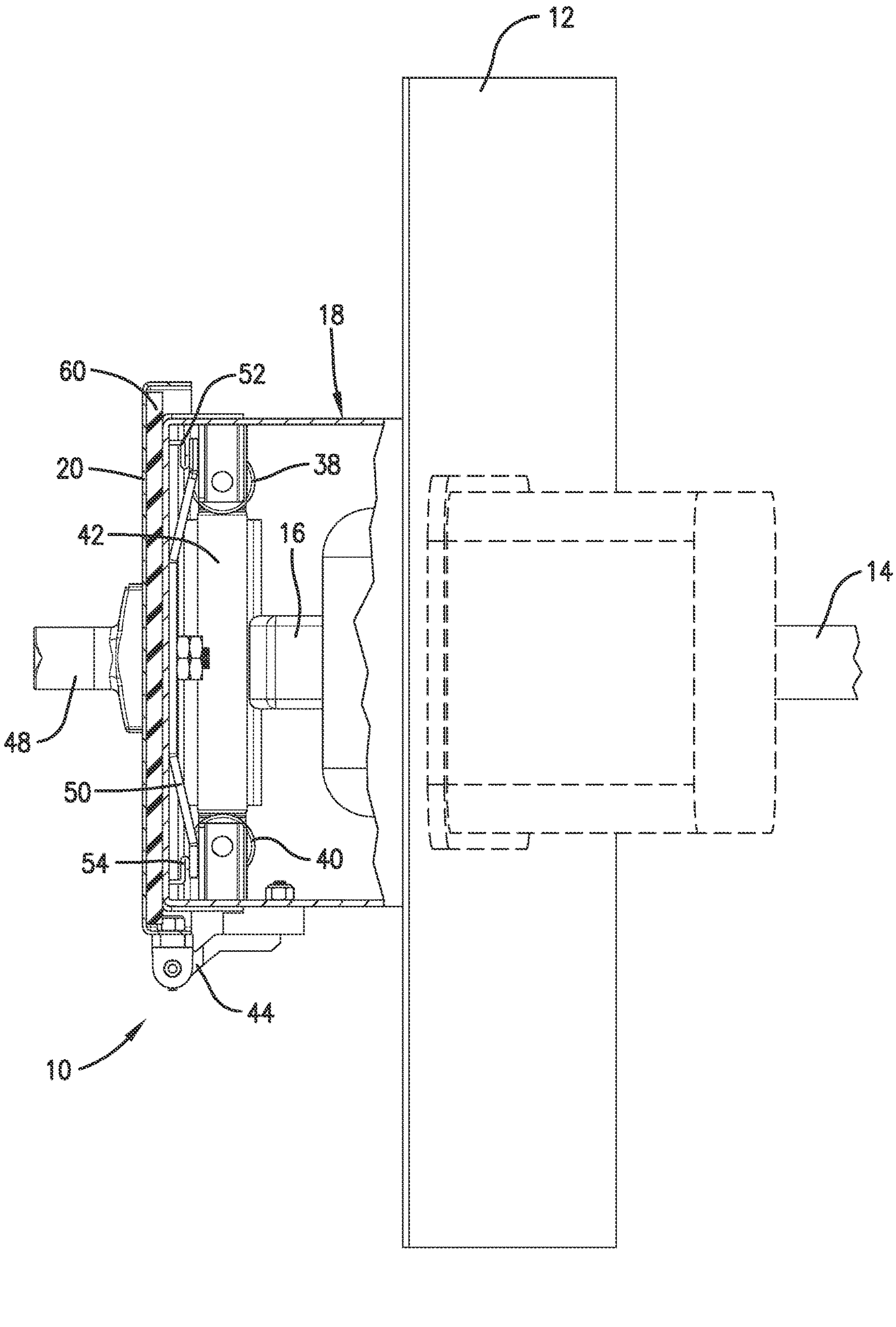
FIG. 3 is a sectional view of the protective enclosure and DEF pump taken along line 3-3 of FIG. 2.

Embodiments of the protective enclosure may further comprise a heater 58 best shown in FIG. 2 for heating the inside of the cabinet to prevent diesel exhaust fluid in the hose and nozzle from freezing. The heater is preferably an electric heater and may have a small fan and fan motor but may also be a heat pump or other heater. In some embodiments, the cabinet is heated with air that is circulated around a DEF tank installed underneath the DEF pump. As best shown in FIG. 3, insulation 60 is adhered to the interior surface of the door to reduce heat loss from the protective enclosure. Similar insulation may be applied to all the interior walls of the cabinet. In one embodiment, the insulation is a foam sealant. The protective enclosure may also comprise a door switch that enables the heater only when the door is closed and a thermostat that enables the heater only when an ambient temperature is below a threshold temperature.

Figure 7:
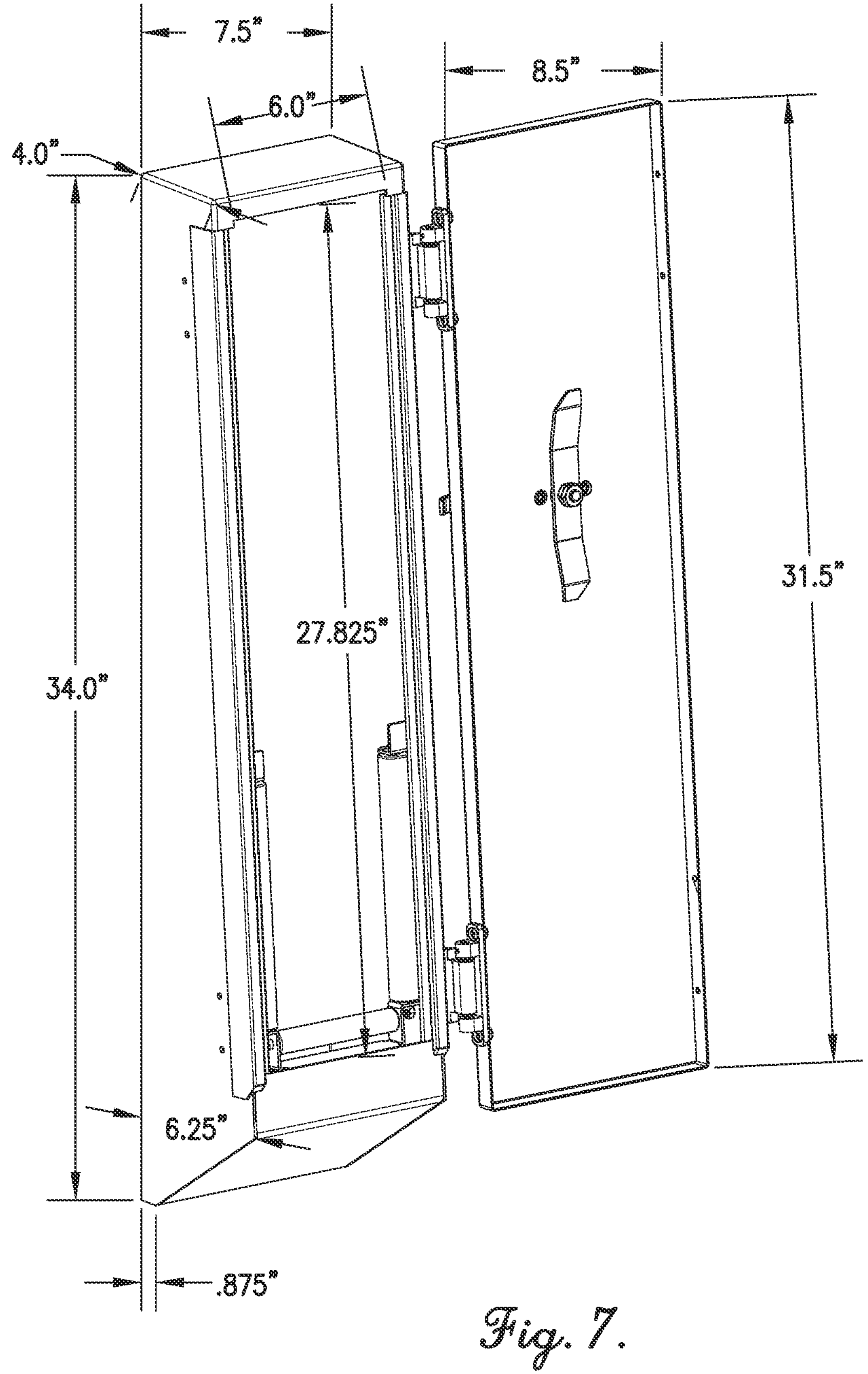
FIG. 7 is a perspective view of an embodiment of the protective enclosure with dimensions shown.

FIG. 7 illustrates one specific embodiment of the protective enclosure 10 with dimensions shown. Other embodiments of the protective enclosure are 10% bigger or smaller than the specified dimensions. Still other embodiments of the protective enclosure are 20% bigger or smaller than the specified dimensions.

The protective enclosure 10 of the present invention provides numerous advantages. Unlike conventional rubber flapper doors, the metal door on the protective enclosure does not easily crack or otherwise break and therefore better protects the hose and nozzle from cold air and moisture even after years of service. Moreover, the handle, locking bar, and locking tabs securely seat the door against the cabinet to further reduce ingress of cold air and moisture into the cabinet. The heater and associated controls maintain the temperature in the cabinet above freezing and the insulation on the door and inside the cabinet prevent excess heat loss. Moreover, the door can be easily mounted to swing either right or left to avoid interference with nearby objects and doesn't fall on or otherwise strike users while they handle the hose and nozzle. The entire protective enclosure or only the door may be removed in warmer seasons to provide unencumbered access to the hose and nozzle and quickly and easily reinstalled in colder seasons. The handle and locking mechanism prevent access to the hose and nozzle when the DEF pump is unavailable for use and keep the door firmly seated against the cabinet opening when the door is closed.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A protective enclosure for a diesel exhaust fluid pump having a filling hose and nozzle, the protective enclosure comprising:

a metal cabinet configured to cover the filling hose and nozzle, the cabinet having an opening that permits retrieval and use of the hose and nozzle, wherein the cabinet has left and right sidewalls that are wider at their bottoms and a bottom wall that slopes downwardly from front to back;

a metal door attached to the cabinet over the opening and shiftable between a closed position in which it covers the opening and an opened position in which it uncovers the opening to provide access to the hose and nozzle;

door hinges that may be connected to a left side of the door and mounted on a left side of the cabinet so the door is hingedly connected to the left side of the cabinet and swings leftward between its closed and opened positions or connected to a right side of the door and mounted on a right side of the cabinet so the door is hingedly connected to the right side of the cabinet and swings rightward between its closed and opened positions;

a handle shiftable between a closed position in which it prevents the door from being opened and an opened position in which it allows the door to be opened;

a locking mechanism for selectively locking and unlocking the handle in its closed position;

insulation on an interior face of the door; and rollers for protecting the filling hose when removed from the cabinet.

2. The protective enclosure of claim 1, further comprising: a heater for heating the cabinet to prevent diesel exhaust fluid in the filling hose and nozzle from freezing; a door switch that enables the heater only when the door is in the closed position; and a thermostat that enables the heater only when an ambient temperature is below a threshold temperature.

3. The protective enclosure of claim 1, wherein the insulation is a foam sealant.

4. The protective enclosure of claim 1, wherein the cabinet is attached to the diesel exhaust fluid pump with removable bolts so that the protective enclosure may be easily removed during seasons of non-freezing weather.

5. A protective enclosure for a diesel exhaust fluid pump having a filling hose and nozzle, the protective enclosure comprising:

a metal cabinet configured to cover the filling hose and nozzle, the cabinet having an opening that permits retrieval and use of the hose and nozzle;

a metal door attached to the cabinet over the opening and shiftable between a closed position in which it covers the opening and an opened position in which it uncovers the opening to provide access to the hose and nozzle, wherein the cabinet has left and right sidewalls that are wider at their bottoms and a bottom wall that slopes downwardly from front to back;

door hinges that may be connected to a left side of the door and mounted on a left side of the cabinet so the door is hingedly connected to the left side of the cabinet and swings leftward between its closed and opened positions or connected to a right side of the door and mounted on a right side of the cabinet so the door is hingedly connected to the right side of the cabinet and swings rightward between its closed and opened positions;

a handle shiftable between a closed position in which it prevents the door from being opened and an opened position in which it allows the door to be opened;

a locking mechanism for selectively locking and unlocking the handle in its closed position;

insulation on an interior face of the door and interior surfaces of the cabinet;

a heater for heating the cabinet to prevent diesel exhaust fluid in the filling hose and nozzle from freezing; and a door switch that enables the heater only when the door is in the closed position; and a thermostat that enables the heater only when an ambient temperature is below a threshold temperature.

6. The protective enclosure of claim 5, wherein the insulation is a foam sealant.

7. The protective enclosure of claim 5, wherein the cabinet is attached to the diesel exhaust fluid pump with removable bolts so that the protective enclosure may be easily removed during seasons of non-freezing weather.

8. The protective enclosure of claim 5, wherein the locking mechanism includes a removable key.

* * * * *